United States Patent
Grummon et al.

(10) Patent No.: US 6,341,341 B1
(45) Date of Patent: Jan. 22, 2002

(54) SYSTEM AND METHOD FOR DISK CONTROL WITH SNAPSHOT FEATURE INCLUDING READ-WRITE SNAPSHOT HALF

(75) Inventors: Jeffrey L. Grummon, Milford; Chris R. Franklin, Merrimack, both of NH (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/465,354

(22) Filed: Dec. 16, 1999

(51) Int. Cl.$^7$ ............................................... G06F 12/16
(52) U.S. Cl. ...................................................... 711/162
(58) Field of Search ............................... 711/161, 162, 711/167; 714/2

(56) References Cited

U.S. PATENT DOCUMENTS

| | | | |
|---|---|---|---|
| 4,654,819 A | 3/1987 | Stiffler et al. ................ 364/900 |
| 5,163,148 A | * 11/1992 | Walls .......................... 395/600 |
| 5,263,154 A | 11/1993 | Eastridge et al. ........... 395/575 |
| 5,375,232 A | * 12/1994 | Legvold et al. ............. 395/575 |
| 5,487,160 A | * 1/1996 | Bemis ........................ 395/441 |
| 5,535,381 A | 7/1996 | Kopper ...................... 395/600 |
| 5,546,534 A | * 8/1996 | Malcolm ................ 395/182.04 |
| 5,675,769 A | 10/1997 | Ruff et al. ............. 395/497.04 |
| 5,737,763 A | * 4/1998 | Hilditch ..................... 711/162 |
| 5,794,254 A | 8/1998 | McClain ..................... 707/204 |
| 5,826,046 A | 10/1998 | Nguyen et al. ............. 395/309 |
| 5,829,053 A | 10/1998 | Smith et al. ................ 711/202 |
| 5,835,953 A | 11/1998 | Ohran ........................ 711/162 |
| 5,907,672 A | 5/1999 | Matze et al. ........... 395/182.06 |
| 5,930,831 A | 7/1999 | March et al. ............... 711/173 |
| 6,202,136 B1 | * 3/2001 | Wihle et al. ................ 711/162 |
| 6,230,246 B1 | * 5/2001 | Lee et al. ................... 711/167 |

* cited by examiner

Primary Examiner—Kevin L. Ellis
(74) Attorney, Agent, or Firm—Cesari and McKenna, LLP

(57) ABSTRACT

A system and method for enabling a snapshot container generated in a copy-on-write backup process to function in the presence of a data-handling system (e.g. a file system) that writes data to the backup disk is provided. The snapshot container, which is read-by and written-to by the system backup application is configured as a read-write container with associated driver. The write data from the backup application is provided to, and stored in the snapshot information container that also receives and stores data from the original read-write container in the manner of a backing store container. Data in the snapshot information container is selectively mapped container as a source, or to backup information container as a source, denoting a backup application write, based upon a bit-map associated with the snapshot driver arrangement. The bit-map designates discrete memory storage block within the container as being mapped to either the original read-write container or as backup write data, denoted as originating within the snapshot information container via the snapshot/backup application.

10 Claims, 3 Drawing Sheets

SYSTEM AND METHOD FOR DISK CONTROL WITH SNAPSHOT FEATURE INCLUDING READ-WRITE SNAPSHOT HALF

FIELD OF THE INVENTION

The invention relates generally to the field of computer systems and more particularly to a system and method for reconfiguring storage devices of a computer system into logical units of storage space on one or more on-line disk drives, typically while the system is in real-time operation.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The applications address those storage devices in terms of the names of files, which contain the information to be sent to or retrieved from them. A file system may be present to translate the file names into logical addresses in the storage subsystem. The operating system forwards I/O requests to an I/O subsystem, which, in turn, converts the logical addresses into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers—and redundant data is distributed across the stripes, the resulting configuration is known as "RAID 10." Generally speaking, all configurations of the RAID implementation (RAID 0–10) provide a collection of partitions, where each partition is composed of space from one disk in order to support data redundancy.

According to a prior system, the I/O subsystem configures the containers through a software entity called a "container manager." Essentially the container manager sets up a mapping structure to efficiently map logical addresses received from the file system to physical addresses on storage devices. The I/O subsystem also includes a software driver for each type of container configuration on the system. These drivers use the mapping structure to derive the physical addresses, which they then pass to the prospective storage devices for storage and retrieval operations.

Specifically, when the computer system is initially organized, the I/O subsystem's container manager configures the containers and maintains the configuration tables in a container layer of the I/O subsystem. In accordance with a co-pending related U.S. patent application Ser. No. 08/964,304, entitled, File Array Storage Architecture by Richard Napolitano et al., now U.S. Pat. No. 6,219,693, the container layer of the I/O subsystem comprises a Device Switch Table, a Container Array, and a Partition Table. The teachings of this application are expressly incorporated herein by reference. The Device Switch table consists of entries, each of which ordinarily points to the entry point of a container driver that performs I/O operations on a particular type of container. The Container Array is a table of entries, each of which ordinarily points to data structures used by a container driver. There is a fixed one-to-one relationship between the Device Switch Table and the Container Array. The Partition Table contains partition structures copied from disk drives for each container on the system. Each Partition Table entry points to one physical disk drive and allows the container driver to access physical location in the on-line storage devices.

When a software process issues an I/O request, the operating system accepts the I/O request and translates it into an I/O request bound for a particular device. The operating system sends the I/O request which includes, inter alia, a block number for the first block of data requested by the application and also a pointer to a Device Switch Table entry which points to a container driver for the container where the requested data is stored. The container driver accesses the Container Array entry for pointers to the data structures used in that container and to Partition Table entries for that container. Based on the information in the data structures, the container driver also accesses Partition Table entries to obtain the starting physical locations of the container on the storage devices. Based on the structures pointed to by the Container Array entry and partition structures in the Partition Table, the container driver sends the I/O request to the appropriate disk drivers for access to the disk drives.

In prior systems, the containers are configured during the initial computer setup and can not be reconfigured during I/O processing without corrupting currently processing I/O requests. As storage needs on a computer system change, the system administrators may need to reconfigure containers to add disks to them or remove disks from them, partition disks drives to form new containers, and/or increase the size of existing containers. If containers are reconfigured during I/O processing in the I/O subsystem, the reconfiguration may corrupt or erase the currently processing I/O requests. However, shutting down the system to reconfigure containers may be unacceptable for businesses that require high availability, i.e., twenty-four hours/seven days a week on-line activity.

One aspect of the system described herein is the routing of I/O requests in the I/O subsystem to a different container than previously pointed to by the operating system. On-line storage devices are configured from on one or more disks into logical units of storage space referred to herein as "containers." Containers are created and maintained by a software entity called the "container manager." Each type of container on the system has an associated driver, which processes system requests on that type of container. After a complete backup operation, the backup program verifies the backed up files to make sure that the files on the secondary storage device (usually a tape) were correctly backed up. One problem with the backup process is that files may change during the backup operation.

To avoid backing up files modified during the backup process and to enable applications to access files during the backup operation, the container manager periodically (e.g. once a day) performs a procedure that takes a "snapshot" or copy of each read-write container whereby, the container manager creates a read-only container which looks like a copy of the data in the read-write container at a particular instant in time. Thereafter, the container manager performs a "copy-on-write" procedure where an unmodified copy of data in the read-write container is copied to a read-only backup container every time is there is a request to modify data in the read-write container. The container manager uses the copy-on-write method to maintain the snapshot and to enable backup processes to access and back up an unchanging, read-only copy of the on-line data at the instant the snapshot was created. This procedure is described in detail in related co-pending U.S. patent application Ser. No. 08/963,754, entitled Copy-on-Write with Compaction by Chris Franklin, the teachings of which are also expressly incorporated herein by reference.

During the backup procedure, the container manager creates a "snapshot" container, a "snapshotted" container and a "backing store" container. After the container manager takes the snapshot, the snapshotted container driver processes all input/output (I/O) requests, to store data in or retrieve data from a read-write container. The snapshotted container driver processes all I/O requests to retrieve data from the read-write container by forwarding them directly to the read-write container driver. However for all I/O requests to modify data in a read-write container, the container manager first determines whether the requested block of data has been modified since the time of the snapshot. If the block has not been modified, the container manager copies the data to the backing store container and then sets an associated bit-map flag in a modified-bit-map table. The modified-bit-map table contains a bit-map with each bit representing one block of data in the read-write container. After setting the modified-bit-map flag, the snapshotted container driver forwards the I/O storage request to the read-write container driver.

When the backup process begins execution, it invokes I/O retrieval requests from the snapshot container. In this example, a file system, which is a component of the operating system, translates the file-oriented I/O request into a logical address and forwards the request to a snapshot container driver. The snapshot container driver checks the associated bit-map in the modified-bit-map table for the requested block of data. If the bit-map is set, the snapshot container driver forwards the request to the backing store container driver to retrieve the unmodified copy of that block from the backing store container. The backing store container driver then processes the backup process retrieval request. If the bit-map is not set, this means that the block has not been modified since the snapshot was created. The snapshot container driver forwards the request to the read-write container driver to retrieve a copy of that block of data from the read-write container. Upon retrieving the file from the backing store container or the read-write container, the backup process backs it up. After a complete backup operation, the container manager deletes the snapshotted container, the snapshot container, the backing store container, and the modified-bit-map table, and thereafter, forwards all I/O requests directly to the read-write container driver.

Many computer systems currently employ the popular Windows® NT operating system, available from Microsoft of Redmond, Wash., as the framework for the running of resident applications and handling files. The particular file system associated with the NT operating system is termed the NT File System, or NTFS. NTFS, in its current version, is designed to work in conjunction with a backup facility generally configured to backup back to the original read-write storage disk. In doing so, it employs a write function to the disk for purposes of, for example marking and/or archive bit handling. Accordingly, there is a significant disadvantage to conventional snapshot arrangements, that generate a read-only snapshot container, when operating in an NT environment. Simply stated, the NTFS will not accept a disk container to which it cannot write (e.g. the read-only snapshot is unacceptable). Rather than performing the desired backup finction, the NTFS, when accessing a read-only snapshot, returns an incompatible disk error message.

There may be other instances, such as in a database, where the ability to write to a snapshot container is also desired. Thus, even where a file system is absent, it is sometimes desirable to provide a write capability to a snapshot.

Accordingly, it is an object of this invention to enable a snapshot backup to be created so that it can operate in conjunction with a system that performs both read and write operations to a disk during backup.

SUMMARY OF THE INVENTION

This invention overcomes the disadvantages of the prior art by providing a system and method for enabling a snapshot container generated in a copy-on-write backup process to function in the presence of a file system, or other data handling system (operating in, for example, a database environment), that writes data to the backup disk. The snapshot container, which is read-by and written-to by the file system backup application is configured as a read-write container with associated driver. The write data from the backup application is provided to, and stored in the snapshot information container that also receives and stores data from the original read-write container in the manner of a backing store container. Data in the snapshot information container is selectively mapped (on a storage block-by-storage block basis) to either the original read-write container as a source, or to backup information container as a source, denoting upon a backup application write within the storage block, based upon a bit-map associated with the snapshot driver arrangement. The bit-map designates discrete memory storage block within the container as being mapped to either the original read-write container or as backup write data, denoted as originating within the snapshot information container via the snapshot/backup application. A file system, according to one example, can comprise an NTFS file system.

BRIEF DESCRIPTION OF THE DRAWINGS

The foregoing and other objects and advantages of the invention will become more clear with reference to the following detailed description as illustrated by the drawings, in which.

DETAILED DESCRIPTION OF AN ILLUSTRATIVE EMBODIMENT

Figure 1:
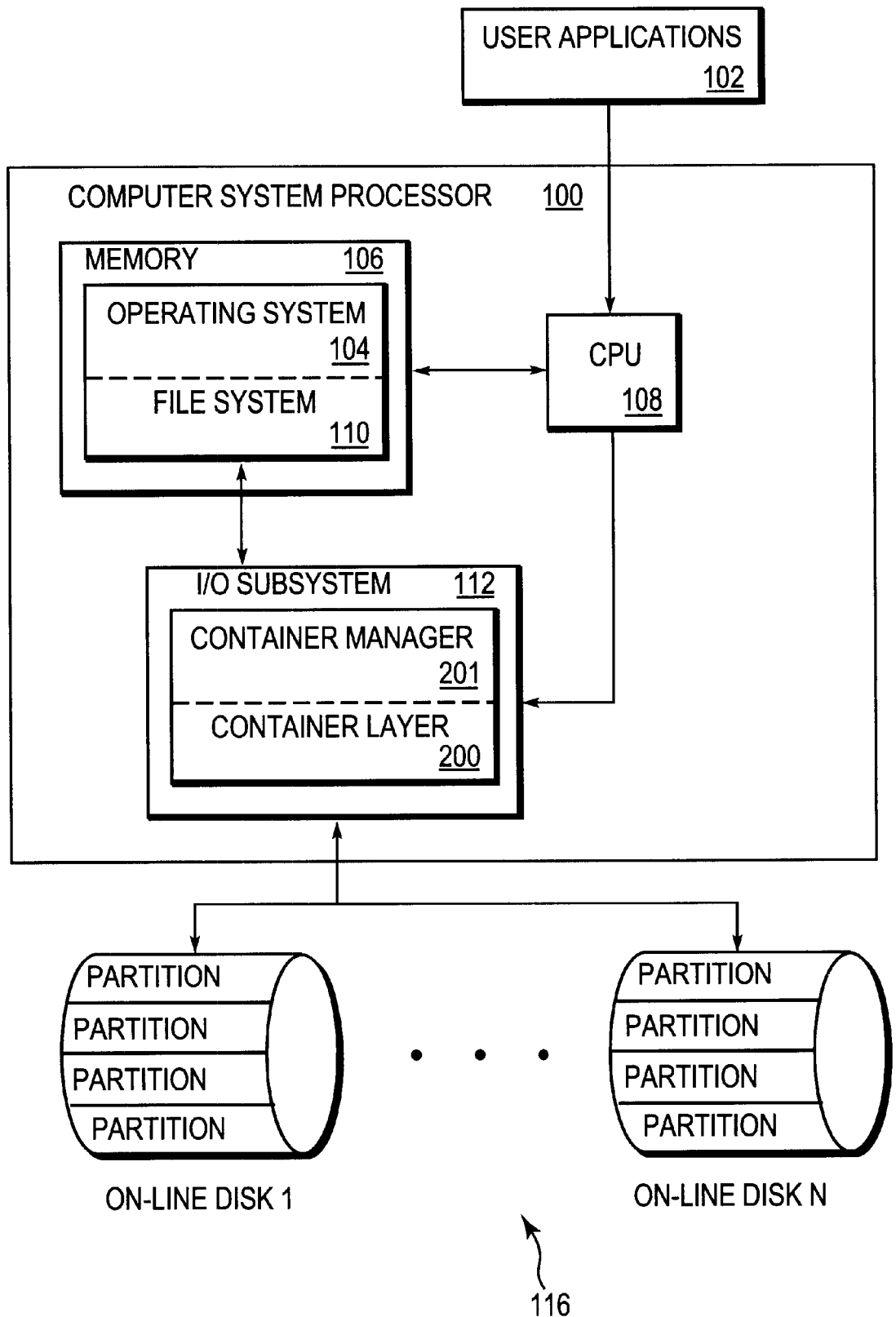
FIG. 1 is a block diagram of a typical RAID storage implementation showing a partitioned set of disks according to the principles of this invention.

FIG. 1 is a schematic block diagram of a typical computer system that is as a RAID 5 storage configuration in accordance with the present invention. The computer system processor 100 comprises a memory 106 and an input/output (I/O) subsystem 112 interconnected with a central processing unit (CPU) 108. User applications 102 are run by the host computer. The memory 106 comprises storage locations addressable by the CPU 108 and I/O subsystem 112 for storing software programs and data structures. An operating system 104, portions of which are typically resident in the memory 106 and executed by the CPU 108, finctionally organizes the computer processor 100 by, inter alia, handling I/O operations invoked by software processes or application programs executing on the computer. A file system 110 may reside in the operating system 104, such as the NT File System (NTFS) from Microsoft. While the principles of this invention are discussed in terms of a file system, a file system is not per se required, and can be absent in certain circumstances. Accordingly the principles to be discussed herein are also applicable to other file-system-free implementations (such as in connection with databases residing on a disk). Accordingly, where "file system" is used herein, the term shall be taken generally to include any environment in which a snapshot backup is employed. The I/O subsystem 112 is, in turn, connected to a set of on-line storage devices 116. These on-line storage devices 116 are partitioned into units of physical space.

The operating system 104 sends I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116 into containers and stores container configuration tables in the container layer 120 of the I/O subsystem 112. Container configuration enables the system administrator to partition a disk drive into one or more virtual disks. A container manager 118 operates in association with the I/O subsystem 112.

Typically, backup operations are performed at the request of a computer operator. In an illustrative backup approach embodiment, the operating system instructs the I/O subsystem 112 to perform a conventional copy-on-write operation in response to the operator's request. This can be an operation performed automatically at the request of the operating system or another application according to alternate embodiments.

Figure 2:
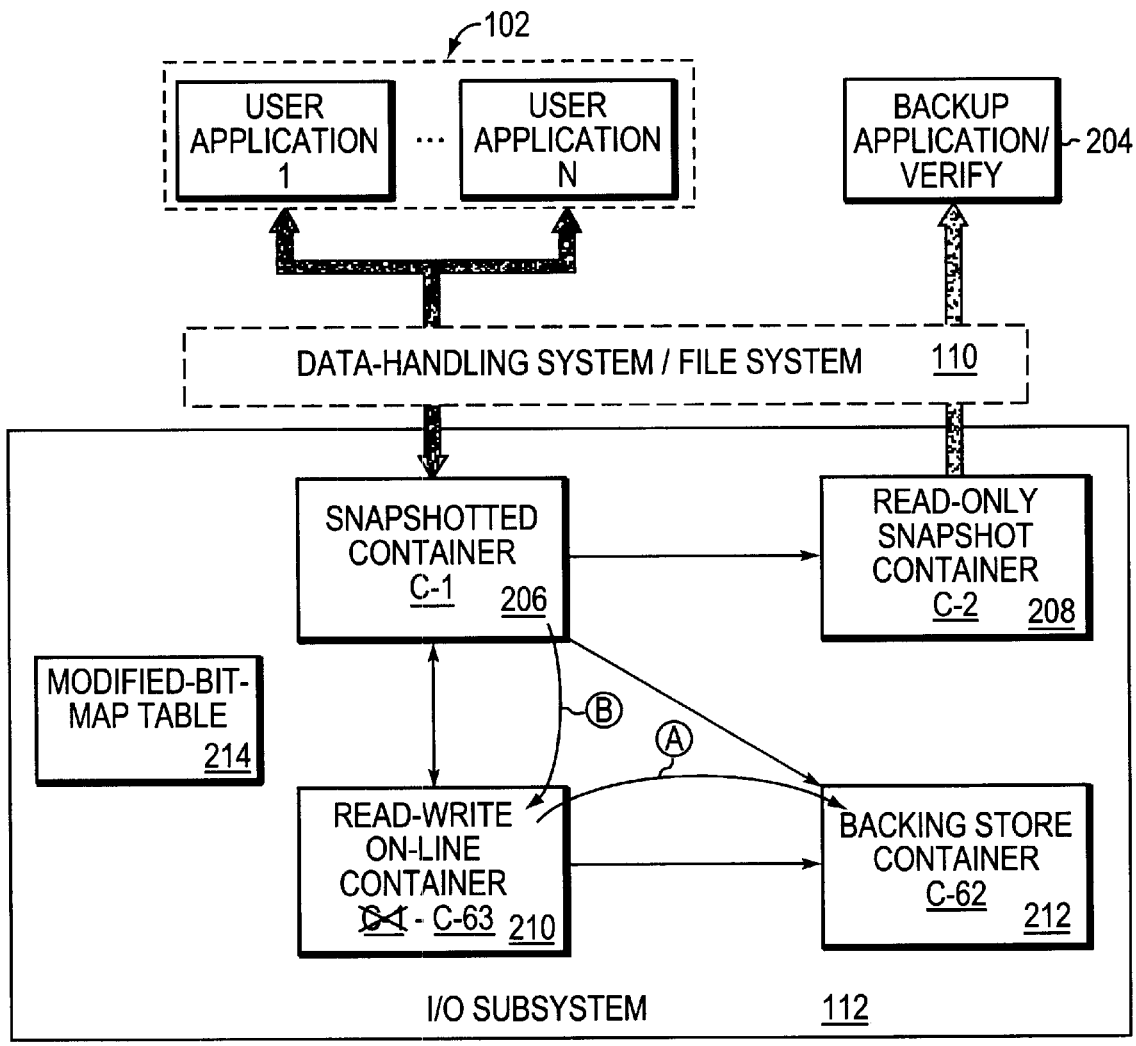
FIG. 2 is a block diagram showing the components of a copy-on-write procedure according to a conventional arrangement in accordance with the principles of this invention.

Referring to FIG. 2, in performing the copy-on-write procedure, the I/O subsystem 112, which reads from and writes to an original read-write container 210, now creates a snapshotted container 206, a snapshot container 208 and a backing store or "backup" container 212. Each container is controlled by an associated container driver that processes I/O requests for that container. For the purposes of this description the driver is assumed to be present on the container or within an associated application or on the adapter for controlling the RAID functionalities. Furthermore the adapter, drivers and other finctionalities of this system can be implemented as hardware, software or a combination of both. When referring to a given container herein (for simplicity), the description thereof is also deemed to include the associated driver and other required adapter funtionalities.

As noted above, before the copy-on-write procedure is performed, all I/O requests for data in the read-write container 210 are forwarded directly to the driver for the read-write container 210. After the copy-on-write procedure, all I/O requests are directed to the driver for the snapshotted container 206. For the purposes of this description the original container, prior to copy-on-write, is designated as C-1 for the purposes of mapping. Following the copy-on-write, the original container 210 is now designated as a hidden container (C-63), while the system maps data directed to C-1 to the snapshotted container 206. This snapshotted container now carries the mapped designation C-1 while that designation is removed from the original read-write container 210 (C-1 being crossed out in favor of C-63). Likewise the snapshot container is known as the mapped designation C-2 while the backing-store/backup container 212 is identified as hidden container C-62. The backup application 204 reads information from this snapshot container 208 and such information is verified thereby.

If the request is a storage request, the system checks the modified-bit-map table 214 to determine if the read-write container's block of data was modified after the snapshot container 208 was created. If the block has been modified, the modified bit is set. Therefore, the snapshotted container 206 forwards the I/O request to the read-write on-line container 210 driver. If however, the block was not modified after snapshot container 208 was created, the container manager copies the unmodified block from the read-write container 210 to the backing store container 212 through the backing store container driver 212. The container manager sets the modified-bit-map table 214 for that block, and sends the I/O request to the read-write container 210 driver for storage in the read-write container 210.

During execution, backup processes 204 forward I/O requests for files to the snapshot container 208. The snapshot container 208 determines whether the file has been modified by checking the modified-bit-map table 214 for the block where the file is stored. If the block has been modified, the snapshot container driver obtains an unmodified copy of the block from the backing store 212 container. If the block has not been modified, the snapshot container 208 driver obtains the unmodified block from the read-write container 210. This ensures that backup processes 204 access an unchanging copy of the data from the time the snapshot is taken.

When information is written to the snapshotted container (once established) from a user application 102 (depicted applications 1–N), the original read-write container 210 is first instructed to transfer its current contents to the backing store container 212 so that it is preserved therein. This step is denoted by an arrow A. Thereafter, the data written to the snapshotted container 206 is transferred into appropriate locations in the original read-write container and a new real-time snapshot is provided to the snapshot container 208.

As noted above, the read-only configuration present in the snapshot container 208 prevents its use in conjunction with NTFS because of the system inability to write into this container. Fundamentally, however, a "snapshot" is typically defined as a read-only entity. Nevertheless if a write operation is permitted within the snapshot, there should be a mechanism, to ensure that this write data is preserved, lest it become lost during the next backup cycle.

Figure 3:
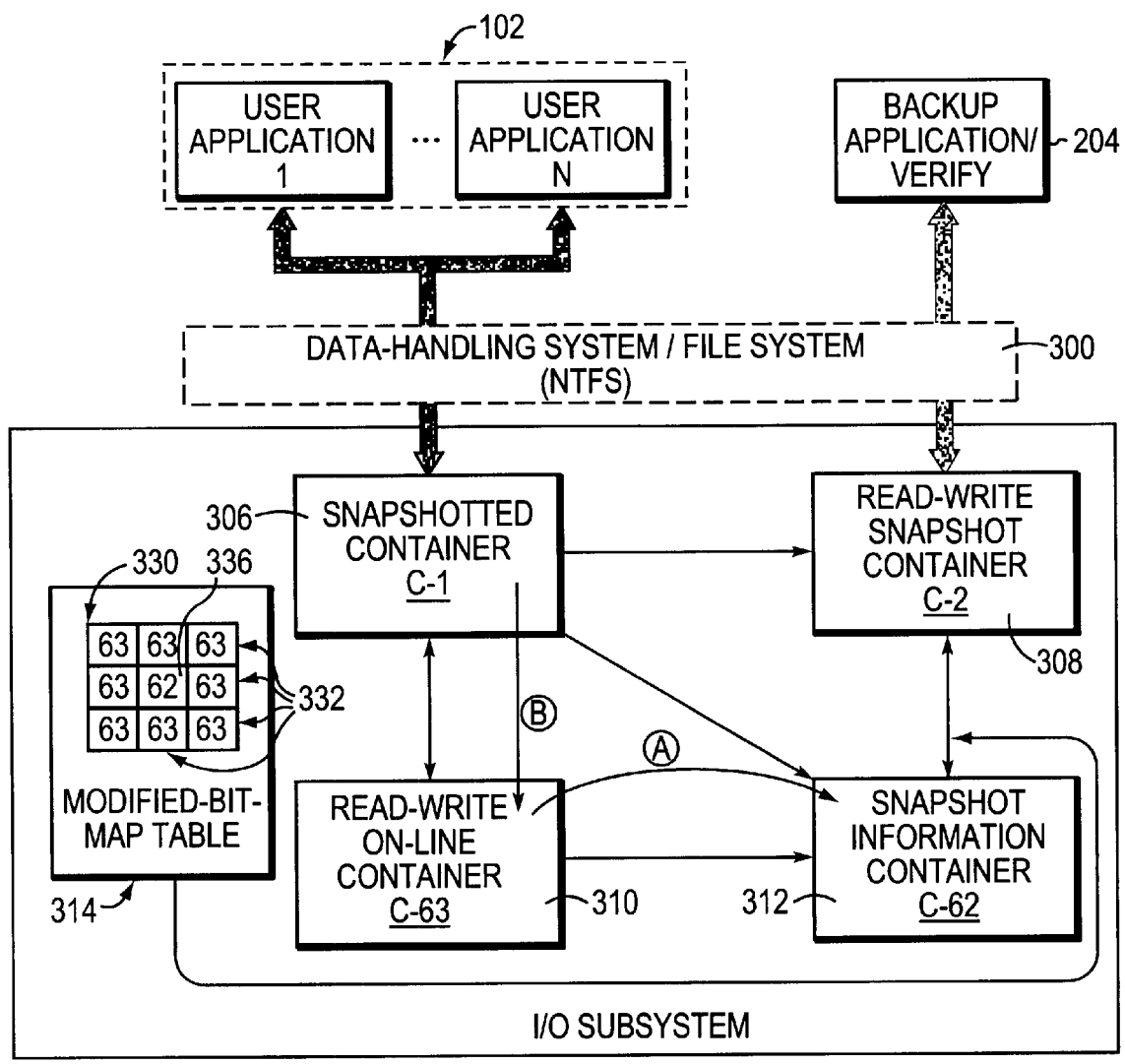
FIG. 3 is a block diagram showing the components of a copy-on-write procedure according to a preferred embodiment of this invention.

Accordingly, reference is now made to FIG. 3 which details a preferred embodiment of the present invention. The illustrated embodiment operates in conjunction with an operating system, that can include the file system 300, or other system, requiring the ability to write to a backup disk. Shown are a snapshotted container 306, snapshot container 308, and original read-write container 310. The system is configured to perform a basic copy-on-write finction as previously described using generally these containers. The modified bit-map table 314 is used to regulate this function generally. The snapshotted container 306 and read-write container are given similar (arbitrary) mapping designations, C-1 and C-63 for the purposes of this description. The snapshot container 308 (similarly designated C-2) differs in that it (based upon its driver) can accept a write of data thereinto from the backup application 204. It is, therefore a "read-write" snapshot container according to this embodiment.

To preserve written data appropriately, the backing store container is now more fully defined as a "snapshot information" container 312 (still retaining the arbitrary designation C-62). That is, the container can track whether information is mapped from the original read-write container 310 or received from the backup application via the snapshot container, which is further configured to transfer write data directly to the snapshot information container 312.

In order to appropriately track information in the backing store container, the mapping functions of table 314, in association with the snapshot driver arrangement, include a bit-map 330 that denotes whether a certain block of storage space within the container is mapped back to the read-write container (C-63), or has been modified by data from the snapshot (therefore mapped to this container, itself, as C-62) as a source thereof. This bit-map may reside within the backing store container or at another accessible location.

Therefore, in the (highly simplified) exemplary map 330 there is shown a series of block representations 332. Those block representations mapping to the associated read-write container storage blocks retain the value 63. One block 336 is shown as modified by the writing of data from the backup application and the designation 63 has been substituted for a new mapping value 62. This enable the system to recognize that this block is modified with respect to the original read-write backup to include at least some write data from the backup application.

If the block into which the backup write data is inserted is not presently occupied by any original read-write data, then it is simply marked to map to C-62. If some original read-write data (denoted C-63) is present in this block, then it should be protected from overwrite or corruption by performing a modified write operation to the block in which preexisting data is masked or avoided using, for example, known techniques.

It should be noted, that conventional copy-on-write operations described above continue to function when an application performs an I/O operation with respect to the snapshotted container—with data being first transferred from the original read-write container to the snapshot information with appropriate bit mapping in connection with the modified bit map table 214, and then data being transferred from the snapshotted container (as changed by the I/O operation to the original read-write container. These operations are modified by the further steps involving the write data provided by the backup as described above.

The foregoing has been a detailed description of a preferred embodiment of the invention. Various modifications and additions can be made without departing from the spirit and scope thereof. Fore example, the configuration described above can be employed in a variety of RAID configurations or in alternative data storage arrangements such as in a database, as described above, since data handling on a block-level is implemented herein, enabling a file system to be omitted. The backup of information can be further refined by providing a smaller-sized backing store (snapshot information) container than the original read-write using techniques such as described in the above referenced Copy-on-Write with Compaction patent application. Accordingly, this description is meant to be taken only by way of example and not to otherwise limit the scope of the invention.

What is claimed is:

1. A system for backup of data employing a snapshot based upon a copy-on-write process in the presence of a data-handling system having a backup application arranged to provide write data to a backup disk, the system comprising:

an original read-write container;

a snapshotted container that receives write data from and provides read data to the data-handling system based upon accessing of the original read-write container by an application;

a read-write snapshot container that stores a real-time copy of data contained in the snapshotted container, data residing on the snapshot container being read by the backup application and the snapshot container being written-to by the backup application at predetermined times with the write data thereof;

a snapshot information container that stores data from the original read-write data and that stores write data of the backup application received from the snapshot container; and a bit-map associated with the snapshot information container that maps data storage blocks therein as associated with either of the original read-write container or the write data of the backup application.

2. The system as set forth in claim 1 wherein at least one of the data storage blocks includes data associated with each of the original read-write container and the write data of the backup application, the bit map representing the one of the data storage blocks as mapped to snapshot information container as a respective source of the data.

3. The system as set forth in claim 2 wherein the original read-write container is a hidden container and the snapshotted container is arranged to transfer data therein to the original read-write container in response to an input/output (I/O) operation performed thereto.

4. The system as set forth in claim 3 wherein the snapshot information container is arranged to receive data currently stored in the original read-write container prior to transfer of data from the snapshotted container to the original read-write container in response to the I/O operation so as to preserve the data currently stored in the original read-write container in the snapshot information container.

5. The system as set forth in claim 1 wherein the data-handling system comprises a file system.

6. A method for backup of data employing a snapshot based upon a copy-on-write process in the presence of a data-handling system having a backup application arranged to provide write data to a backup disk, the system comprising:

providing an original read-write container;

receiving, at a snapshotted container, write data from and providing, from the snapshotted container, read data to the data-handling system based upon accessing of the original read-write container by an application;

storing, in a read-write snapshot container, a real-time copy of data contained in the snapshotted container, data residing on the snapshot container being read by the backup application and the snapshot container being written-to by the backup application at predetermined times with the write data thereof;

storing, in a snapshot information container, data from the original read-write data and write data of the backup application received from the snapshot container; and mapping, with a bit-map associated with the snapshot information container, data storage blocks therein as associated with either of the original read-write container or the write data of the backup application.

7. The method as set forth in claim 6 further comprising defining at least one of the data storage blocks to include data associated with each of the original read-write container and the write data of the backup application, the bit map representing the one of the data storage blocks as mapped to snapshot information container as a respective source of the data.

8. The method as set forth in claim 7 further comprising establishing the original read-write container is a hidden container and configuring the snapshotted to transfer data therein to the original read-write container in response to an input/output (I/O) operation performed thereto.

9. The method as set forth in claim 8 further comprising configuring the snapshot information container to receive data currently stored in the original read-write container prior to transfer of data from the snapshotted container to the original read-write container in response to the I/O operation so as to preserve the data currently stored in the original read-write container in the snapshot information container.

10. The method as set forth in claim 6 wherein the steps of receiving, at a snapshotted container, write data from and providing, from the snapshotted container, read data to the data-handling system includes receiving, at a snapshotted container, write data from and providing, from the snapshotted container, read data to a file system.

* * * * *